E. F. NORTHRUP.
CONTROL APPARATUS.
APPLICATION FILED OCT. 25, 1909.

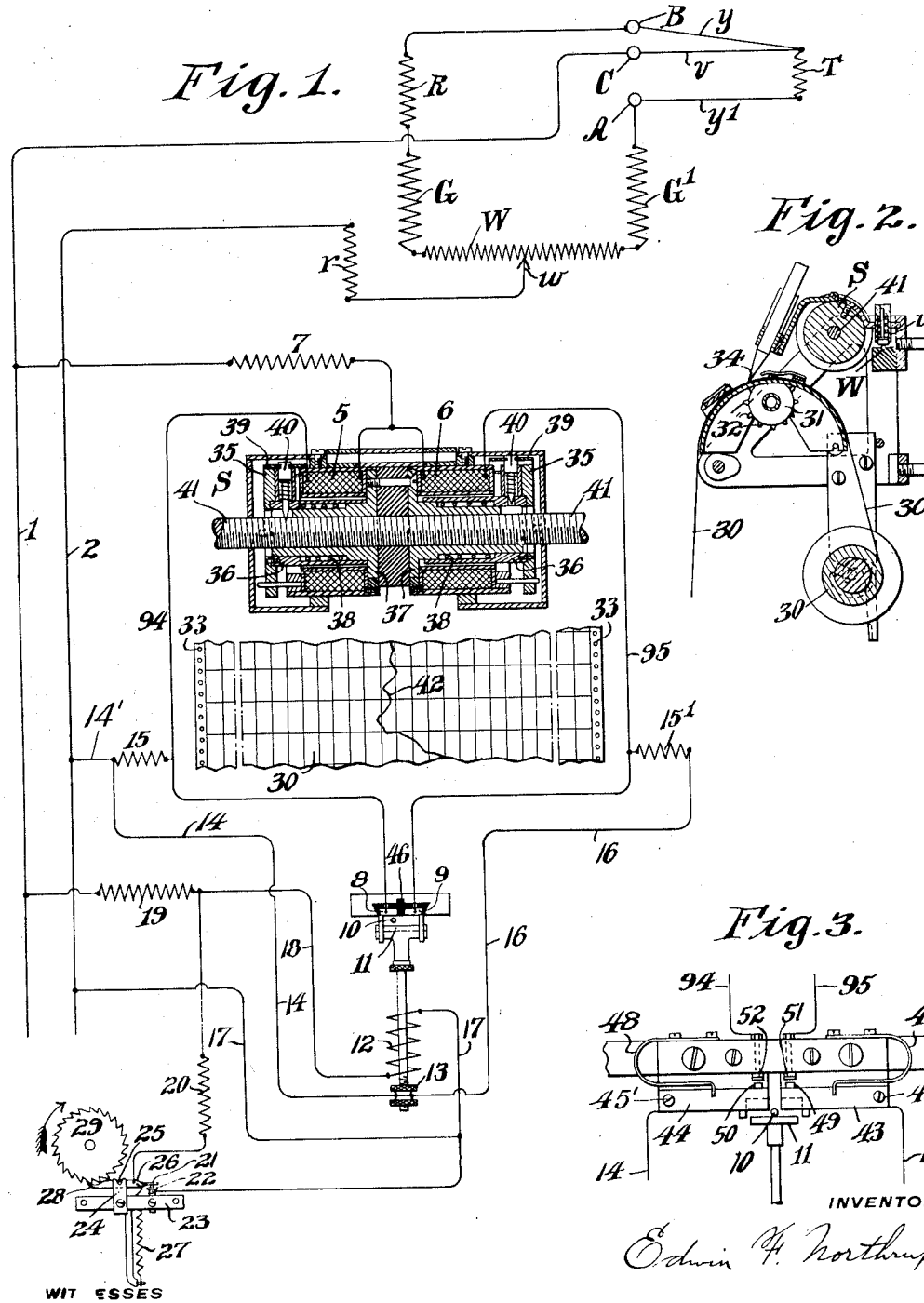

1,022,498.

Patented Apr. 9, 1912.

2 SHEETS—SHEET 2.

WITNESSES
William Conway
Anna E. Steinbock

INVENTOR
Edwin F. Northrup
BY Cornelius D. Ehret
his ATTORNEY

UNITED STATES PATENT OFFICE.

EDWIN F. NORTHRUP, OF PHILADELPHIA, PENNSYLVANIA, ASSIGNOR TO LEEDS AND NORTHRUP COMPANY, A CORPORATION OF PENNSYLVANIA.

CONTROL APPARATUS. REISSUED

1,022,498. Specification of Letters Patent. Patented Apr. 9, 1912.

Original application filed February 16, 1909, Serial No. 478,144. Divided and this application filed October 25, 1909. Serial No. 524,349.

*To all whom it may concern:*

Be it known that I, EDWIN F. NORTHRUP, a citizen of the United States, residing in the city of Philadelphia, county of Philadelphia, and State of Pennsylvania, have invented certain new and useful Improvements in Control Apparatus, of which the following is a specification.

My invention resides in a system of and apparatus for exercising control over mechanism or apparatus to cause the same to be controlled or actuated in response to predetermined conditions, such as physical, electrical, chemical, mechanical, or other conditions.

It is characteristic of my invention that a selector is provided for choosing or selecting a path along which mechanical, electrical, or other energy shall flow or shall be transmitted, the selected apparatus being suitably controlled or actuated in response to predetermined conditions, such as changes in physical, electrical, chemical, mechanical, or other quantities; and the continuance or amount of energy flow over the selected path is preferably in no way determined by the selector.

In or as the selecting apparatus, I may employ a galvanometer, ohmmeter, relay, or any other suitable device which shall control or cause the selection of a path along which energy shall flow or be transmitted, a periodically controlled or operating device coöperating with the galvanometer or other device, so that a path for energy may be periodically provided, depending upon the deflection or other condition or operation of the galvanometer or other device.

It is a feature of my invention that in making the selection of a path, no work is done, whereas the amount of energy transmitted over the path selected may be as great as desired; and the energy so available over the selected path may be used for any purpose, as for actuating or controlling apparatus or a translating device.

My invention resides in other features of system and apparatus hereinafter described and pointed out in the claims.

This application is a division of my prior application upon which were granted Letters Patent of the United States No. 950,555, March 1, 1910.

Figure 5:
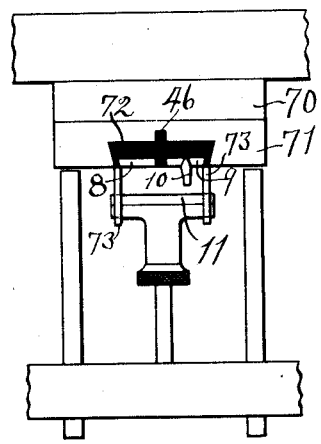
Figure 4:
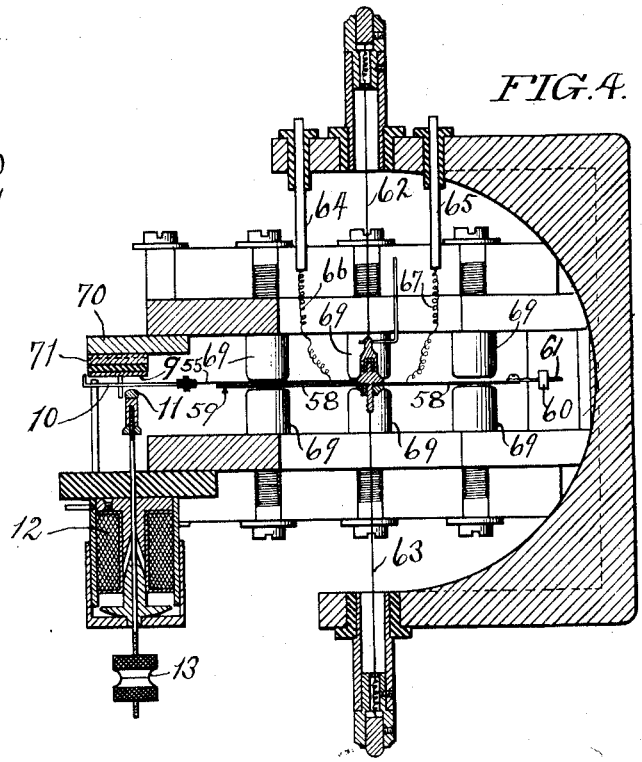
Figure 6:
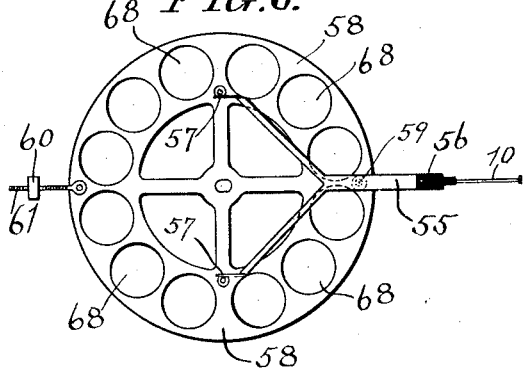

For an example of one of the applications of my control system and apparatus and for an illustration of one of the forms my invention may take, reference is to be had to the accompanying drawing, in which:

Figure 1 is a diagrammatic view illustrating an application of my invention. Fig. 2 is a side elevational view, some parts in section, of a piece of controlled mechanism or a translating device. Fig. 3 is a front elevational view of a modified arrangement for selecting and providing a path along which energy may be transmitted. Fig. 4 is a vertical sectional view, some parts in elevation through a galvanometer and contacting device. Fig. 5 is a front elevation, on larger scale, of a part of the galvanometer, showing the contacting device. Fig. 6 is a plan view of the moving member or system of the galvanometer, comprising moving coils and their support, and a galvanometer needle or pointer.

Merely by way of illustration and example, and without limiting my invention, I have shown my control system and apparatus applied to temperature recording apparatus. It is to be understood that my invention is not limited as to the kind of energy transmitted over a selected path, nor to the mechanism or apparatus controlled or actuated by such transmitted energy, inasmuch as any translating device controlled or actuated by the transmitted energy is within my invention.

Referring to Fig. 1, T represents a bulb or thermometer resistance, while $v$, $y$ and $y'$ are the thermometer leads, G and G' are the two differential windings of a galvanometer, R is a fixed resistance which may be employed, and W is a conductor with which engages the contact $w$, movable by the step-by-step mechanism, hereinafter described, for restoring balance. Conductors 1 and 2 connect with any suitable source of electrical energy, such, for example, as a commercial lighting or power circuit of 110 volts or any other pressure.

The windings 5 and 6 are those of two electro-magnets of the step-by-step mechanism which moves the marker and the contact $w$ over the conductor W. It is to be understood, however, that these windings may be windings used for any other purpose in any suitable translating device, which translating instrument may exercise any suitable control or do any suitable work. Between the conductor 1 and the common terminal of the windings 5 and 6 there is inserted a suitable resistance 7, when required, for limiting the current flow through the windings 5 and 6. The other terminals of the windings 5 and 6 connect, respectively, through conductors 94 and 95 with the contacts 8 and 9 supported in operative relation with the normally freely moving or deflecting member 10 which may be a part of or attached to the needle of a galvanometer, or any other electrical, chemical, or mechanical instrument or device.

The member 10 is any movable member which is deflected or moved in response to any predetermined condition, physical, chemical, electrical, mechanical, or otherwise. In the arrangement shown in Fig. 1, 10 operates as an electrical conductor or contact to place either of the contacts 8 or 9 into electrical communication with the contact 11 which is moved upwardly to engage the contact 10 to clamp it between contact 11 and either of the contacts 8 or 9, upon the energization of the solenoid or magnet whose winding is 12. From the contact 8 to the binding post 13, the latter movable with the core of the solenoid whose winding is 12 and making electrical communication with the contact 11, extends a conductor 14 in which is connected a suitable resistance 15. And, similarly, from contact 9 to the binding post 13, extends a conductor 16 in which is connected a suitable resistance 15', the conductors 14 and 16, and, therefore, contact 11, being also in communication with conductor 2 of the supply circuit through conductor 14'. The winding 12 is connected across the conductors 1 and 2 by the conductors 17 and 18, suitable resistance 19 intervening, if necessary. In shunt to the winding 12 is connected a circuit including the resistance 20 and the contacts 21 and 22 which are normally in engagement with each other, and when so in engagement they shunt the winding 12 to deënergize the same. When the contacts 21 and 22 separate, the winding 12 is energized and operates to lift the contact 11 to clamp the member 10 against either of contacts 8 or 9, depending upon the direction of deflection of the member 10, or if not deflected, against the insulation material 46. The contact 22 is adjustably mounted upon the support 23. In a bracket 24 there is pivoted at 25 a lever 26 whose outer end carries the coöperating contact 21. The contacts 21 and 22 are normally held in engagement by the action of spring 27. At the opposite end of the lever 26 there is a hook-like termination 28 with which engage the teeth of the wheel 29 forming part of or associated with a clock mechanism, the direction of rotation being that indicated by the arrow. As the wheel 29 rotates a tooth engages the hook 28 and slightly tilts the lever 26 to separate the contacts 21 and 22 a short distance. This distance may be made very short indeed, because the contacts 21 and 22 are in a shunt circuit where practically no sparking will occur. From the fact that the lever 26 need be shifted only very slightly, there is only slight engagement between the teeth of the wheel 29 and the hook 28, thus introducing a minimum of friction and requiring the clock mechanism to do a minimum of work. And from the relatively slight overlap of the teeth and the hook 28, flows a further result that actuation of the lever 26 is nicely timed, and the separation of the contacts 21 and 22 is relatively short. The clock mechanism, therefore, causes a periodic energization of the magnet or solenoid 12 resulting in the periodic elevation of the contact 11 to clamp the member 10, if deflected, against either one or the other of the contacts 8 or 9, depending upon the direction of deflection. If the galvanometer or other device of which the member 10 is a part or by which the member 10 is controlled, is in balance, the member 10 will come opposite the space or insulation 46 and no circuit will be completed to energize or actuate a translating device, as the step-by-step mechanism carrying the marker and contact.

By the clock mechanism, which may be the same as that controlling the contacts 21 and 22, the record sheet 30 is fed by the feed wheel 31 whose spurs 32 engage in the perforations 33 of the record sheet to feed the same past and under the marker 34 carried by the step-by-step mechanism S shown in longitudinal section in Fig. 1. This step-by-step mechanism also moves the movable contact $w$ which engages the conductor W to control any suitable circuit, here shown as means for rebalancing the galvanometer circuit.

The step-by-step mechanism comprises the windings 5 and 6, each provided with an armature 35 having a cylindrical shank 36 adapted, when the associated winding is energized, to move until limited by engagement with flange 37. A helical spring 38 serves to hold each armature in unattracted position. Carried by each armature member 35 is a loosely mounted iron strap 39 constituting an associate armature and which, upon the energization of a winding, is adapted to be immediately attracted radially to cause the pointed member 40 to project into the longitudinal bore through which extends a roughened or finely screw-threaded rod 41, a helical spring serving to retract the pointed member 40 when the electro-magnet is deënergized. In Fig. 1 the parts are shown in a position corresponding with energization of the winding 5, with the member 36 abutting against flange 37 and the subsidiary armature 39 in attracted position and the pointed member 40 in engagement with the rod 41.

When either winding is energized, for example winding 5, the armature 39 and the attached pointed member 40, having relatively small inertia, are first actuated to grip the roughened or screw-threaded rod 41. This fixes the member 35, and further attraction causes the winding and the remainder of the device to be attracted toward the member 35, until the limit of its movement is reached. By this operation, therefore, the whole device has moved along the rod or member 41 a definite distance, and upon deënergization of the winding 5, the device remains in its new position and the armature 35 moves outwardly after the member 40 has been released. Successive energizations cause similar and equal spacings of the device which, as before noted, carries a marker, or a movable contact, or which may do any other work.

The operation is as follows: The clock mechanism constantly rotates at a uniform rate feeding the record sheet or paper 30 past the marker 34, the marker tracing a straight line upon the record until the step-by-step mechanism S is actuated. When the temperature to be measured (taking temperature control as an example) changes or varies, the resistance of the thermometer bulb T changes or varies and will thus cause more current to pass through one of the galvanometer coils G or G' than through the other, causing the moving system of the galvanometer to deflect from the zero or balance position. In so doing, the moving system does no work, the contact 10 being freely carried through space. Supposing the deflection to be toward the left, as viewed in Fig. 1, due to such unbalancing, at the following energization of the winding 12 the contact 10 is clamped between contacts 8 and 11, thus short circuiting the resistance 15 and causing increased current to flow through the winding 5 of the step-by-step mechanism, such current being sufficient to cause the step-by-step mechanism to be energized or to operate, the pointed member 40 being first attracted into engagement with the roughened or screw-threaded member 41 and then the device S is attracted toward the left, as previously described. This moves the marker 34 a definite distance or increment across the record sheet 30. Simultaneously, however, the contact $w$ is moved along the resistance conductor W in such direction as to tend to restore a balance of the current in the two windings of the galvanometer. If this increment of movement of the step-by-step mechanism has been sufficient to restore a balance, the contact 10 carried by the galvanometer pointer, comes to mid position, and upon the next energization of the magnet 12, the contact 10 will contact insulating material, or, at any rate, will complete no circuit. If, however, balance has not been restored, the contact 10 will remain to the left, as viewed in Fig. 1, and the next energization of the magnet 12 will cause the step-by-step mechanism to move another increment to the left. This action keeps up until balance is restored. And, similarly, if the contact 10 be deflected toward the right, the step-by-step mechanism is moved toward the right until a balance is reached. And thus moving backward and forward across the sheet the marker or pencil produces a line record, as 42, indicated on the record sheet 30 in Fig. 1.

While the member 10, hereinbefore described, has been shown as a contact to cause or control an electrical circuit, such member 10 may be used simply as a mechanical device, as shown in Fig. 3, which, when deflected, to right or left, and when raised by member 11, may engage one or the other of the two levers 43 or 44 pivoted, respectively, at 45 and 45', the levers being pressed downwardly by the springs 47 and 48, against suitable stops. When the member 10 is in balance it lies between the ends of the levers 43 and 44, and when raised by the periodically operating member 11, the member 10 does not engage either of the levers. When the member 10, which may be of insulating material in this case, is deflected, it is raised by the member 11 into engagement with the under side of either one of the levers 43 or 44, and the member 11 then transmits mechanical energy through the member 10 to lift the lever which has been engaged in opposition to its spring. The levers 43 and 44 carry the contacts 49 and 50, respectively, which engage, respectively, with contacts 51 and 52 with which communicate the conductors 95 and 94, respectively, for purposes such as shown in Fig. 1. In electrical communication with contact 49 is conductor 16, and in communication with contact 50 is conductor 14, for the purposes illustrated in Fig. 1.

The operation is the same as described in connection with Figs. 1 and 2, except that the member 10 operates simply as a mechanical medium through which the mechanical power of the member 11 is transmitted to actuate the levers 43 and 44 to make contact for controlling the step-by-step mechanism. Or the mechanical energy so transmitted through the member 10 may do any suitable work, or the electrical energy controlled by the levers 43 and 44 may do any suitable work to control or actuate any suitable translating device.

Without limiting my invention thereto, but only for the purpose of illustration of an example of galvanometer and contacting device, reference may be had to Figs. 4, 5 and 6.

The member 10 is carried by or is a part of the galvanometer pointer or needle 55, suitable insulation 56 intervening when desired. The needle 55 is pivoted or hinged to the aluminum disk 58 at 57, 57, so that when the winding 12 is energized the contact 11 lifts the contact 10 and may clamp it into engagement with either of the stationary contacts 8 or 9, the pointer or needle 55 moving during such action upon its hinges or pivots. An adjusting screw 59, Fig. 4, passes through the disk 58 and engages the under side of the pointer or needle 55, so as to determine or adjust its normal elevation. A counterweight 60 is adjustable upon the screw 61 carried by the disk 58.

The moving system of the galvanometer has a filar or torsion suspension by means of the conducting wires 62, 63, which are insulated from each other and may serve as the terminals of one of the differential windings, as G, Fig. 1, of the moving system. The insulated studs 64 and 65 may serve as the terminals for the other differential winding, as G', Fig. 1, flexible connections 66 and 67 leading from these studs 64, 65, to the other differential winding also carried by the disk 58. The coils 68, shown by way of example, in Fig. 6, as twelve (12) in number, are preferably bifilarly wound, that is, each coil 68 is made up of two windings, these two separate windings constituting the differential windings G and G' of the instrument. These bifilarly wound coils are differentially wound or differentially connected and are supported in the magnetic field maintained by permanent magnets having the pole pieces 69 which are preferably disposed with respect to the coils in the manner described in Letters Patent of the United States No. 800,873, and the moving system suspension is substantially that described in said Letters Patent. It is to be understood, however, that this invention is not limited to a galvanometer of this construction or type.

At the front of the galvanometer upon a plate 70 is secured a plate 71 upon which is secured the insulation 72, such as ivory, upon which are secured the silver or other contacts or plates 8 and 9 insulated from each other and from the frame or parts of the galvanometer.

As seen in Fig. 5, on larger scale, the contact 10 may swing to right or left beneath the contacts 8 and 9, the studs or pins 73, 73 carried by plate 71, serving as stops and serving also to prevent the T-shaped head carrying the contact 11 from turning.

I do not claim the hereinbefore described recording system and apparatus, the same being claimed in my aforesaid Patent No. 950,555.

What I claim is:

1. The combination with a selector member, of paths over which energy may be transmitted, said paths being normally incomplete, a second member periodically engaging and moving said selector member, means periodically actuating said second member, means against which said selector member may be moved by said second member, said selector member when moved against said last mentioned means causing the completion of one of said paths, and apparatus controlled by energy transmitted over said completed path.

2. The combination with a selector member, of paths over which energy may be transmitted, said paths being normally incomplete, a second member periodically engaging said selector member, means periodically actuating said second member, said selector member when engaged by said second member causing the completion of one of said paths; and step-by-step mechanism controlled by energy transmitted over said completed path.

3. The combination with a deflecting selector member responsive to changes in a condition, of paths over which energy may be transmitted, said paths being normally incomplete, a second member periodically engaging said selector member, means periodically actuating said second member, said selector member when deflected and engaged by said second member causing the completion of one of said paths, and a member moved by the energy transmitted over said completed path so long as said selector member remains deflected.

4. The combination with a galvanometer having a moving system, of a member carried by said moving system, a circuit, a second member periodically actuating said first named member, means periodically actuating said second member, said first named member when actuated by said second member controlling said circuit, and step-by-step mechanism controlled by the energy transmitted over said circuit.

5. The combination with a galvanometer having a moving system, of a member carried by said moving system, a second member periodically engaging said first named member, means periodically actuating said second member, a pair of members normally out of engagement with said first named member and either one of which may be engaged by said first named member when actuated by said second member, a path over which energy may be transmitted completed in response to said engagement of one of said pair of members by said first named member, and apparatus controlled by the energy transmitted over said path.

6. The combination with a galvanometer having a movable member, of paths along which energy may be transmitted, said paths being normally incomplete, a second member periodically engaging said movable member to complete one of said paths, means periodically actuating said second member, and step-by-step apparatus actuated by the energy transmitted over said completed path a step for each completion of said path.

7. The combination with a galvanometer having a movable member, of a fixed contact, a movable contact carried by said movable member, said fixed and movable contacts being normally out of engagement with each other, a circuit, a second member periodically moving said movable contact into engagement with said fixed contact to control said circuit, means periodically actuating said second member, and apparatus controlled by the energy transmitted through said circuit.

8. The combination with a deflecting selector and a plurality of paths over which energy may be transmitted, said paths being normally incomplete when said selector is deflected, means against which said selector may be moved, a member periodically moving said selector against said means to complete one of said paths, means periodically actuating said member, and apparatus actuated by the energy transmitted over said completed path.

9. The combination with an instrument having a deflecting member, a pair of circuits, a fixed member, means movable in different directions with respect to said fixed member by the energy transmitted through said circuits, contacts controlling each circuit, a second member periodically actuating said deflecting member, and means periodically actuating said second member, the actuation of said deflecting member by said second member causing the control of one of said circuits by its contacts.

10. The combination with a galvanometer having a deflecting member, of a plurality of circuits, a fixed member, means actuated in different directions with respect to said fixed member by the energy transmitted over said different circuits, and means periodically actuating said deflecting member, the actuation of said deflecting member by said means causing transmission of energy over said circuits.

11. The combination with a galvanometer having a moving system, of a deflecting member moved freely through space thereby, of a plurality of circuits over which energy may be transmitted, means against which said deflecting member may be moved, a second member periodically moving said deflecting member against said means to control one of said circuits, means periodically actuating said second member, and an electro-magnet in each of said circuits.

12. The combination with an instrument having a deflecting member, of circuits through which energy may be transmitted, a second member periodically actuating said deflecting member to control said circuits, and means for periodically actuating said second member comprising an electro-magnet, a circuit including said electro-magnet, contacts controlling said circuit, and means bringing said contacts periodically into engagement.

13. The combination with an instrument having a deflecting member, of circuits through which energy may be transmitted, a second member periodically actuating said deflecting member to control said circuits, and means for periodically actuating said second member comprising an electro-magnet, a circuit including said electro-magnet, contacts controlling said circuit, and a clock wheel periodically controlling said contacts.

14. The combination with an instrument having a deflecting member, of circuits through which energy may be transmitted, a second member periodically actuating said deflecting member to control said circuits, and means for periodically actuating said second member comprising an electro-magnet, a circuit including said electro-magnet, normally engaging contacts controlling a circuit in shunt to said electro-magnet, and means for periodically separating said contacts.

15. The combination with a movable member of an indicating or measuring instrument, of a second member, means periodically bringing said second member into engagement with said movable member to actuate the latter, a movable device, step-by-step mechanism for actuating said movable device, and means for controlling said step-by-step mechanism including means engaged by said movable member when actuated.

16. The combination with a movable member, of electro-responsive means for controlling the movement thereof, a second member, means for bringing said second member periodically into engagement with said movable member to actuate the same, a movable device, step-by-step mechanism for actuating said movable device, and means for controlling said step-by-step mechanism including means engaged by said movable member when actuated.

17. The combination with a member deflectable to either side of a zero or normal position, of paths along which energy may be transmitted, said paths being normally incomplete, a second member periodically actuating said first mentioned member when deflected to select and close one of said paths, means periodically actuating said second member, and apparatus actuated by the energy transmitted over said completed path.

18. The combination with a member deflectable to either side of a zero or normal position, of a second member, means for bringing said second member periodically into engagement with said movable member to actuate the same when deflected, a movable device, step-by-step mechanism for actuating said movable device, and means engaged by said movable member when deflected and actuated by said second member for controlling said step-by-step mechanism.

19. The combination with a movable member, of means for moving the same in response to a condition, paths along which energy may be transmitted, said paths being normally incomplete, a second member, means bringing said second member periodically into engagement with said movable member to actuate the same for selecting and closing a path, and apparatus actuated by the energy transmitted through said selected and completed path.

20. The combination with a movable member, of means for moving the same in response to a change in a condition, paths along which energy may be transmitted, said paths being normally incomplete, a second member, means bringing said second member periodically into engagement with said movable member to actuate the same for selecting and completing a path, and step-by-step mechanism actuated by the energy transmitted over said selected and completed path a step for each actuation of said movable member.

21. The combination with a member deflectable to either side of a zero or normal position, of a plurality of circuits, a second member, means periodically actuating said second member to actuate said deflecting member to select and close one of said circuits, and apparatus controlled by the energy transmitted over said selected circuit.

22. The combination with a deflecting member, of a fixed electrical contact, a movable electrical contact, means for periodically moving said movable contact and clamping said deflecting member between said fixed and movable contacts, and a circuit controlled by said contacts.

23. The combination with a member adapted to freely deflect to either side from a zero or normal position, a circuit, a second member, said deflecting member being normally free from said second member, and means bringing said second member periodically into engagement with said deflecting member, whereby said circuit is controlled by said engagement of said deflecting member by said second member.

24. The combination with an indicating instrument having a freely deflecting member, of a second member normally free from said deflecting member and adapted to actuate said deflecting member, an electric-magnet for actuating said second member, and a periodic contacting device controlling said electric-magnet.

25. The combination with an indicating instrument having a deflecting member, of a second member adapted to actuate said deflecting member to select a path over which energy may be transmitted, an electro-magnet for actuating said second member, a periodic contacting device controlling said electro-magnet, and step-by-step mechanism controlled by energy transmitted over a path selected by said deflecting member.

26. The combination with a movable device, of a movable member, means for moving said movable member in response to a change in a quantity, paths over which energy may be transmitted, said paths being normally incomplete, a second member periodically actuating said movable member to select and close a path, and step-by-step mechanism having a movable part moved equal increments by successive closures of said path, said step-by-step mechanism controlling said movable device.

27. The combination with a galvanometer having a moving system, of a member carried by said moving system, paths over which energy may be transmitted, said paths being normally incomplete, a second member periodically actuating said first mentioned member to select and close a path, and means for restoring said galvanometer to normal controlled by energy transmitted over said path.

28. The combination with a galvanometer having a moving system, of a member carried by said moving system, a second member adapted to actuate said member, means periodically actuating said second member, a third member controlling restoration of said galvanometer to normal, step-by-step mechanism controlling said third member, a source of energy for actuating said step-by-step mechanism, said first named member when deflected and actuated by said second member controlling said source of energy.

29. The combination with a galvanometer having a moving system, of a member carried by said moving system, a second member periodically actuating said first mentioned member, step-by-step mechanism, a source of energy for actuating said step-by-step mechanism, said first mentioned member when deflected and actuated by said second member controlling said source of energy, and a contact moved by said step-by-step mechanism through equal increments for successive actuations of said first mentioned member.

30. The combination with a galvanometer having a moving system, of a member carried by said moving system, a second member periodically actuating said first mentioned member, step-by-step mechanism, a source of energy for actuating said step-by-step mechanism, said first mentioned member when actuated by said second member controlling said source of energy, the increments of movement of said step-by-step mechanism being equal, a contact actuated by said step-by-step mechanism, and a circuit controlled by said contact.

31. The combination with a galvanometer having a moving system, of a member carried by said moving system, a second member periodically actuating said first mentioned member, step-by-step mechanism, a source of energy for actuating said step-by-step mechanism, said first mentioned member when actuated by said second member controlling said source of energy, said step-by-step machanism having a part moving by equal increments in response to successive actuations of said first mentioned member, a contact controlled by said step-by-step mechanism, and a circuit associated with said galvanometer controlled by said contact.

32. The combination with a galvanometer having a moving system, of a member carried by said moving system, a second member periodically actuating said first mentioned member, step-by-step mechanism, a source of energy for actuating said step-by-step mechanism, said first mentioned member when actuated by said second member controlling said source of energy, said step-by-step mechanism having a movable part moving by equal increments in response to successive actuations of said first mentioned member, a contact controlled by said step-by-step mechanism, and a circuit associated with said galvanometer including a resistance controlled by said contact.

33. The combination with a galvanometer having a moving system, of a member moved freely through space by said moving system, a circuit, a second member normally free from said first mentioned member periodically actuating said first mentioned member to control said circuit, and apparatus controlled by said circuit.

34. The combination with a freely movable member, of a second member normally free from said movable member adapted to engage and actuate said movable member, means periodically actuating said second member, a plurality of contacts one or another of which is controlled by said movable member in response to its actuation by said second member, and a circuit controlled by each of said contacts.

35. The combination with an instrument having a moving system, of a deflecting member moved freely through space thereby, a stationary member, means periodically clamping said deflecting member against said stationary member, and step-by-step mechanism controlled by said deflecting member.

36. The combination with an instrument having a moving system, of a deflecting member moved freely through space thereby, a stationary member, means periodically clamping said deflecting member against said stationary member, a circuit controlled by said deflecting member and said stationary member, and step-by-step mechanism controlled by said circuit.

37. The combination with a deflecting member, of electro-responsive means controlling said deflecting member, a stationary member, means periodically clamping said deflecting member against said stationary member, and step-by-step mechanism controlled by said deflecting member.

38. Step-by-step mechanism comprising a fixed member, an electro-magnet surrounding said member and movable with respect thereto, an armature for said electro-magnet, a second member supported by said armature and adapted to engage said fixed member, and an associate armature of smaller mass than said first named armature actuated by said electro-magnet in advance of said armature to cause said second member to engage said fixed member.

39. Step-by-step mechanism comprising an electro-magnet, an armature therefor, an associate armature of smaller mass than said armature, a member actuated by said associate armature, and a fixed member adapted to be engaged by said member actuated by said associate armature, said armature being actuated after said associated armature for moving said electro-magnet with respect to said fixed member.

40. Step-by-step mechanism comprising a fixed member, an electro-magnet and its armature both movable with respect to said fixed member, and means actuated by said magnet for clamping said armature to said fixed member, the attraction between said magnet and its armature moving said magnet relatively to said fixed member.

41. Step-by-step mechanism comprising an electro-magnet and its armature, a fixed member extending axially through said magnet, said magnet and its armature both movable with respect to said fixed member, and means actuated by said magnet for clamping said armature to said fixed member, the attraction between said magnet and its armature moving said magnet with respect to said fixed member.

42. The combination with a movable member, of means responsive to temperature changes for controlling said movable member, a path over which energy may be transmitted, said path being normally incomplete, a second member periodically actuating said movable member to select and complete said path, and apparatus controlled by the energy transmitted over said selected and completed path.

43. The combination with a movable member, of means responsive to temperature changes for controlling said movable member, paths along which energy may be transmitted, said paths being normally incomplete, a second member periodically actuating said movable member to select and complete one of said paths, electro-magnetic means periodically actuating said second member, and apparatus controlled by energy transmitted over the selected and completed path.

44. The combination with a freely movable member, of means responsive to temperature changes for controlling said member, a second member periodically actuating said movable member, and step-by-step mechanism having a movable part moving by equal increments in response to the successive actuations of said movable member by said second member.

45. The combination with an instrument having differential windings, of circuit balancing means comprising a resistance and a movable contact, one of said differential windings of said differential instrument and a thermometer resistance being connected in one branch of a circuit, said differential instrument having a movable member, another of said differential windings of said differential instrument being connected in another branch of said circuit, a second member periodically actuating said movable member of said differential instrument, and apparatus actuated in response to said actuation of said movable member.

46. The combination with an instrument having differential windings, of circuit balancing means comprising a resistance and a movable contact, one of said differential windings of said differential instrument and a thermometer resistance being connected in one branch of a circuit, said differential instrument having a movable member, another of said differential windings of said differential instrument being connected in another branch of said circuit, a second member periodically actuating said movable member of said differential instrument, and step-by-step mechanism actuated through equal increments in response to successive actuations of said movable member.

In testimony whereof I have hereunto affixed my signature in the presence of the two subscribing witnesses.

EDWIN F. NORTHRUP.

Witnesses:
H. D. JAMESON,
R. I. WILLIAMS.